(12) United States Patent
Chen et al.

(10) Patent No.: US 9,906,394 B2
(45) Date of Patent: Feb. 27, 2018

(54) METHOD AND APPARATUS FOR SENDING SYNCHRONIZATION SIGNAL IN FBMC SYSTEM

(71) Applicant: Huawei Technologies Co., Ltd., Shenzhen (CN)

(72) Inventors: Lei Chen, Shenzhen (CN); Guangmei Ren, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 111 days.

(21) Appl. No.: 14/962,856

(22) Filed: Dec. 8, 2015

(65) Prior Publication Data

US 2016/0094377 A1 Mar. 31, 2016

Related U.S. Application Data

(63) Continuation of application No. PCT/CN2014/081001, filed on Jun. 27, 2014.

(30) Foreign Application Priority Data

Jun. 27, 2013 (CN) .......................... 2013 1 0271847

(51) Int. Cl.
  *H04L 27/26* (2006.01)
  *H04L 5/00* (2006.01)

(52) U.S. Cl.
  CPC ........ *H04L 27/2692* (2013.01); *H04L 5/0053* (2013.01); *H04L 5/0062* (2013.01); *H04L 27/264* (2013.01)

(58) Field of Classification Search
  None
  See application file for complete search history.

(56) References Cited

U.S. PATENT DOCUMENTS

2003/0031238 A1    2/2003  Li et al.
2008/0159423 A1*   7/2008  Omoto ................ H04L 27/2698
                                                        375/260

(Continued)

FOREIGN PATENT DOCUMENTS

CN         1315808 A    10/2001
CN       101860497 A    10/2010
CN       102497348 A     6/2012

OTHER PUBLICATIONS

Stitz et al., "Practical Issues in Frequency Domain Synchronization for Filter Bank Based Multicarrier Transmission," ISCCSP, Malta, pp. 411-416, Institute of Electrical and Electronics Engineers, New York, New York (Mar. 2008).

(Continued)

*Primary Examiner* — Kouroush Mohebbi
(74) *Attorney, Agent, or Firm* — Leydig, Voit & Mayer, Ltd.

(57) ABSTRACT

Embodiments of the present disclosure relate to a method and an apparatus for sending a synchronization signal in an FBMC system in the field of communications, and are used for reducing the cost of a synchronization signal and improving the spectral efficiency. The method provided by the embodiments of the present disclosure includes: determining a sending time-frequency resource location of a synchronization symbol; determining a time-frequency resource location having mutual interference with the synchronization symbol; sending the synchronization symbol on the sending time-frequency resource location of the synchronization symbol, and sending a protection symbol on the time-frequency resource location having mutual interference with the synchronization symbol.

18 Claims, 8 Drawing Sheets

(56) References Cited

U.S. PATENT DOCUMENTS

2012/0243625 A1 9/2012 Berg
2015/0049836 A1* 2/2015 Li .................... H04L 5/0048
　　　　　　　　　　　　　　　　　　　　　　　375/295

OTHER PUBLICATIONS

Tanda et al., "Data-aided synchronization and initialization (single antenna)," PHYDYAS, Seventh Framework Programme, FP7-ICT Future Networks, Specific Targetted Research Project, Project Deliverable (Jul. 22, 2008).

* cited by examiner

METHOD AND APPARATUS FOR SENDING SYNCHRONIZATION SIGNAL IN FBMC SYSTEM

CROSS-REFERENCE TO RELATED APPLICATIONS

This application is a continuation of International Patent Application No. PCT/CN2014/081001, filed on Jun. 27, 2014, which claims priority to Chinese Patent Application No. 201310271847.9, filed on Jun. 27, 2013, both of which are hereby incorporated by reference in their entireties.

TECHNICAL FIELD

The present disclosure relates to the field of communications, and particularly, to a method and an apparatus for sending a synchronization signal in an FBMC (filter bank multicarrier) system.

BACKGROUND

Orthogonal frequency division multiplexing (OFDM) technology is the most widely used multicarrier modulation technology at present. Filter bank multicarrier (FBMC) technology becomes an alternative technology of the OFDM technology due to the advantages of good out-of-band rejection effect and high spectral efficiency.

The multicarrier modulation technology is susceptible to carrier frequency offset (CFO) and time offset, specifically, the frequency offset and the time offset will make inter-symbol interference exacerbated, and cause the performance of an FBMC system deteriorated. Therefore, a reliable and accurate synchronization signal must be designed when designing the FBMC system.

A common synchronization signal sending method in the FBMC system is a data-aided based synchronization signal sending method, including training sequences based on repeated structures. The training sequences based on the repeated structures refer to that a transmitting terminal continuously sends at least two identical training sequences (namely, synchronization signals), and a receiving terminal processes the received signals by means of the same property of sending symbols between the two training sequences to obtain a frequency offset estimated value, so as to achieve frequency synchronization. The characteristics of the synchronization signal sending method lie in that certain protection symbols are reserved before and after the synchronization signal, and no data symbol is sent on the protection symbols, to avoid the interference of the data symbol on a synchronization symbol.

In a design process of the above-mentioned synchronization signal, the inventor finds that at least the following problems exist in the prior art: the transmitting terminal needs to send at least two identical synchronization signals, and the protection symbols need to be arranged before and after the synchronization signals, resulting in a larger cost of the synchronization signals and low spectral efficiency; moreover, a complicated algorithm is necessary for the receiving terminal to perform the frequency synchronization.

SUMMARY

Embodiments of the present disclosure provide a method and an apparatus for sending a synchronization signal in an FBMC system, for reducing the synchronization signal cost and improving the spectral efficiency.

To fulfill the above-mentioned purpose, the embodiments of the present disclosure adopt the following technical solutions:

In a first aspect, a method for sending a synchronization signal in an FBMC system is provided, including:
determining a sending time-frequency resource location of a synchronization symbol;
determining a time-frequency resource location having mutual interference with the synchronization symbol; and
sending the synchronization symbol on the sending time-frequency resource location of the synchronization symbol, and sending a protection symbol on the time-frequency resource location having mutual interference with the synchronization symbol.

In combination with the first aspect, in a first possible implementation manner, the sending time-frequency resource location of the synchronization symbol is located on at least one multicarrier symbol of a starting position or an end position of once continuous signal transmission.

In combination with the first aspect or the first possible implementation manner of the first aspect, in a second possible implementation manner, the determining a time-frequency resource location having mutual interference with the synchronization symbol includes:
utilizing the time-frequency resource location with transmultiplexer response of the synchronization symbol within a preset range as the time-frequency resource location having mutual interference with the synchronization symbol according to the transmultiplexer response.

In combination with the first possible implementation manner of the first aspect, in a third possible implementation manner,
when the sending time-frequency resource location of the synchronization symbol is located on at least one multicarrier symbol of a starting position of once continuous signal transmission, the time-frequency resource location having mutual interference with the synchronization symbol is located on at least one multicarrier symbol after the multicarrier symbol where the synchronization symbol is located;
or, when the sending time-frequency resource location of the synchronization symbol is located on at least one multicarrier symbol of an end position of once continuous signal transmission, the time-frequency resource location having mutual interference with the synchronization symbol is located on at least one multicarrier symbol before the multicarrier symbol where the synchronization symbol is located.

In combination with the first aspect, in a fourth possible implementation manner, the determining a sending time-frequency resource location of a synchronization symbol includes:
determining a frequency domain interference range of the synchronization symbol according to transmultiplexer response; and
determining the sending time-frequency resource location of the synchronization symbol according to the frequency domain interference range, wherein an interval between the sending time-frequency resource locations of any two synchronization symbols on the same multicarrier symbol is greater than or equal to the frequency domain interference range.

In combination with the first aspect, in a fifth possible implementation manner, the method further includes: determining a value of the synchronization symbol, wherein the values of the synchronization symbols on the same multicarrier symbol are symmetrical with respect to the central frequency of the synchronization signal.

In combination with the fifth possible implementation manner of the first aspect, in a sixth possible implementation manner, the values of the synchronization symbols on the same multicarrier symbol are real numbers.

In combination with the first aspect, in a seventh possible implementation manner, the method further includes: determining a value of the protection symbol, wherein the disturbance variable of the value of the protection symbol on the synchronization symbol is zero.

In combination with the seventh possible implementation manner of the first aspect, in an eighth possible implementation manner, the value of the protection symbol is zero.

In combination with the seventh possible implementation manner of the first aspect, in a ninth possible implementation manner, the determining a value of the protection symbol includes:

determining the value of the protection symbol according to the transmultiplexer response, the sending time-frequency resource location of the synchronization symbol and the time-frequency resource location having mutual interference with the synchronization symbol.

In a second aspect, a synchronization signal sending apparatus is provided, including:

a first determining unit, configured to determine a sending time-frequency resource location of a synchronization symbol;

a second determining unit, configured to determine a time-frequency resource location having mutual interference with the synchronization symbol; and a sending unit, configured to send the synchronization symbol on the sending time-frequency resource location of the synchronization symbol, and send a protection symbol on the time-frequency resource location having mutual interference with the synchronization symbol.

In combination with the second aspect, in a first possible implementation manner, the sending time-frequency resource location of the synchronization symbol is located on at least one multicarrier symbol of a starting position or an end position of once continuous signal transmission.

In combination with the second aspect or the first possible implementation manner of the second aspect, in a second possible implementation manner, the second determining unit is configured to utilize the time-frequency resource location with transmultiplexer response of the synchronization symbol within a preset range as the time-frequency resource location having mutual interference with the synchronization symbol according to the transmultiplexer response.

In combination with the first possible implementation manner of the second aspect, in a third possible implementation manner, when the sending time-frequency resource location of the synchronization symbol is located on at least one multicarrier symbol of a starting position of once continuous signal transmission, the time-frequency resource location having mutual interference with the synchronization symbol is located on at least one multicarrier symbol after the multicarrier symbol where the synchronization symbol is located;

or, when the sending time-frequency resource location of the synchronization symbol is located on at least one multicarrier symbol of an end position of once continuous signal transmission, the time-frequency resource location having mutual interference with the synchronization symbol is located on at least one multicarrier symbol before the multicarrier symbol where the synchronization symbol is located.

In combination with the second aspect, in a fourth possible implementation manner, the first determining unit is configured to, determine a frequency domain interference range of the synchronization symbol according to transmultiplexer response; and determine the sending time-frequency resource location of the synchronization symbol according to the frequency domain interference range, wherein an interval between the sending time-frequency resource locations of any two synchronization symbols on the same multicarrier symbol is greater than or equal to the frequency domain interference range.

In combination with the second aspect, in a fifth possible implementation manner, the apparatus further includes:

a third determining unit, configured to determine a value of the synchronization symbol, wherein the values of the synchronization symbols on the same multicarrier symbol are symmetrical with respect to the central frequency of the synchronization signal.

In combination with the fifth possible implementation manner of the second aspect, in a sixth possible implementation manner, the values of the synchronization symbols on the same multicarrier symbol are real numbers.

In combination with the second aspect, in a seventh possible implementation manner, the apparatus further includes:

a fourth determining unit, configured to determine a value of the protection symbol, wherein the disturbance variable of the value of the protection symbol on the synchronization symbol is zero.

In combination with the seventh possible implementation manner of the second aspect, in an eighth possible implementation manner, the value of the protection symbol is zero.

In combination with the seventh possible implementation manner of the second aspect, in a ninth possible implementation manner, the fourth determining unit is configured to determine the value of the protection symbol according to the transmultiplexer response, the sending time-frequency resource location of the synchronization symbol and the time-frequency resource location having mutual interference with the synchronization symbol.

According to the method and the apparatus for sending the synchronization signal in the FBMC system provided by the embodiments of the present disclosure, by determining the sending time-frequency resource location of the synchronization symbol, determining the time-frequency resource location having mutual interference with the synchronization symbol, sending the synchronization symbol on the sending time-frequency resource location of the synchronization symbol, and sending the protection symbol on the time-frequency resource location having mutual interference with the synchronization symbol, synchronization of the FBMC system is achieved using one synchronization signal, thereby the cost of the synchronization signal is saved and the spectral efficiency is improved.

DESCRIPTION OF EMBODIMENTS

An exemplary illustration of a method and an apparatus for sending a synchronization signal in an FBMC system provided by the embodiments of the present disclosure will be given below in combination with the accompanying drawings.

Figure 1:
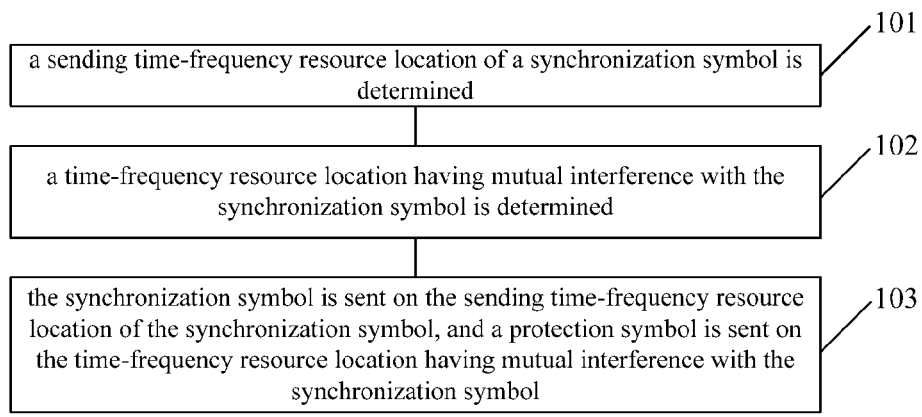
FIG. 1 is a schematic diagram of a flow of a method for sending a synchronization signal provided by an embodiment of the present disclosure.

In one aspect, referring to FIG. 1, it is a method for sending a synchronization signal in an FBMC system provided by an embodiment of the present disclosure, including:

101: a sending time-frequency resource location of a synchronization symbol is determined;

Exemplarily, the method for sending a synchronization signal in the FBMC system provided by the embodiment of the present disclosure may be used for achieving an orthogonal frequency division multiplexing/offset quadrature amplitude modulation (OFDM/OQAM) solution of FBMC technology. The FBMC system includes a transmitting terminal and a receiving terminal, and both of the transmitting terminal and the receiving terminal can be a base station, an access point (AP) or a user equipment, etc.

The transmitting terminal sends a multicarrier signal to the receiving terminal, and the multicarrier signal is carried on a time-frequency resource location marked by "subcarrier" and "multicarrier symbol". A synchronization symbol refers to a symbol for synchronization on one time-frequency resource location. The synchronization signal is composed of synchronization symbols located on a plurality of time-frequency resource locations. A protection symbol refers to a symbol located on the surrounding of the time-frequency resource location where the synchronization symbol is located and used for protecting the synchronization symbol from being interfered.

Some concepts in the embodiment of the present disclosure will be illustrated below:

1) Data symbol: the multicarrier signal includes a data symbol, a synchronization symbol, a protection symbol, a pilot symbol and the like, since the data symbol is in the majority, for simplicity and convenience of description, the symbols excluding the synchronization symbol and the protection symbol are collectively called data symbols in the embodiment of the present disclosure.

2) Sending time-frequency resource location: the time-frequency resource location of the transmitting terminal; the sending time-frequency resource location determined by a subcarrier m and a multicarrier symbol n is marked as a sending time-frequency resource location (m, n);

receiving time-frequency resource location: the time-frequency resource location of the receiving terminal; the receiving time-frequency resource location determined by the subcarrier m and the multicarrier symbol n is marked as a receiving time-frequency resource location (m, n);

wherein the sending time-frequency resource location and the receiving time-frequency resource location are of one-to-one correspondence. Specifically, m represents the serial number of the subcarrier, and n represents the serial number of the multicarrier symbol, and then the sending time-frequency resource location and the receiving time-frequency resource location determined by the subcarrier m and the multicarrier symbol n are corresponding.

3) Sending symbol: a symbol sent on a sending resource location;

receiving symbol: a symbol received on a receiving resource location;

available receiving symbol: a receiving symbol received by the receiving time-frequency resource location (m, n) and generated by the sending symbol on the sending time-frequency resource location (m, n);

disturbance: a receiving symbol received by the receiving time-frequency resource location (m, n) and generated by the sending symbols on other sending time-frequency resource locations excluding the sending time-frequency resource location (m, n).

4) Transmission slot: in a wireless communication system, the minimum time unit of (data) signal transmission is generally called a frame (Frame), a subframe (Subframe), a burst (Burst) or a slot (Slot) and the like. For example, in a long term evolution (LTE) system, the minimum time unit of the (data) signal transmission is called a subframe. In an embodiment of the present disclosure, the minimum time unit of the (data) signal transmission is called a transmission slot, and the transmission slot may include a downlink transmission slot and an uplink transmission slot.

The transmitting terminal performs such processing on data as uniform encoding, modulation and the like within one transmission slot; the receiving terminal performs such processing on the data as uniform demodulation, decoding and the like within one transmission slot.

5) Once continuous signal transmission: a plurality of continuous transmission slots; wherein a plurality of continuous downlink transmission slots are called once downlink continuous signal transmission; a plurality of continuous uplink transmission slots are called once uplink continuous signal transmission.

Figure 2:
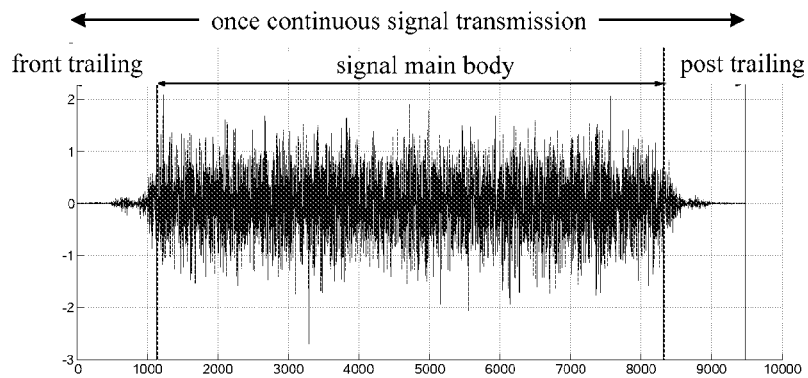
FIG. 2 is a schematic diagram of once continuous signal transmission in an FBMC system provided by an embodiment of the present disclosure.

In the wireless communication system, signal transmission may be continuous and may also be discontinuous, for example, in a frequency division duplexing (FDD) system, the transmission of downlink signals is continuous; in a time division duplexing (TDD) system, the signal transmission may be discontinuous. Different continuous signal transmissions are discontinuous in terms of time. For the FBMC system, due to the action of a filter, a trailing is respectively generated on a starting position and an end position of the once continuous signal transmission, this segment of trailing reduces the signal transmission rate and is a cost for signal transmission. FIG. 2 is a schematic diagram of once continuous signal transmission in the FBMC system, the once continuous signal transmission includes a front trailing, a main body for signal transmission and a post trailing, wherein although having lower power, the front trailing and the post trailing may not be simply discarded, otherwise signal transmission quality and outband leakage may be deteriorated.

Further, the determining the sending time-frequency resource location of the synchronization symbol specifically is: determining the multicarrier symbol and the subcarrier where the sending time-frequency resource location of the synchronization symbol is located.

Optionally, the sending time-frequency resource location of the synchronization symbol is located on at least one multicarrier symbol within the transmission slot or between adjacent transmission slots. Exemplarily, in this situation, a protection symbol for protecting the synchronization symbol may be arranged on at least one multicarrier symbol on the two adjacent sides of the multicarrier symbol where the synchronization symbol is located.

Optionally, the sending time-frequency resource location of the synchronization symbol is located on at least one multicarrier symbol of the starting position or the end position of once continuous transmission.

Exemplarily, when the sending time-frequency resource location of the synchronization symbol is located on at least one multicarrier symbol of the starting position of once continuous transmission, the front trailing is transmitted before the synchronization symbol, and the interference of the data symbol on the synchronization symbol does not exist, therefore, the protection symbol may be only arranged after the multicarrier symbol where the synchronization symbol is located; when the sending time-frequency resource location of the synchronization symbol is located on at least one multicarrier symbol of the end position of once continuous transmission, the post trailing is transmitted after the synchronization symbol, and the interference of the data symbol on the synchronization symbol does not exist either, therefore, the protection symbol may be only arranged in front of the multicarrier symbol where the synchronization symbol is located.

Optionally, the determining a sending time-frequency resource location of a synchronization symbol includes:
determining a frequency domain interference range of the synchronization symbol according to transmultiplexer response; and
determining the sending time-frequency resource location of the synchronization symbol according to the frequency domain interference range, wherein an interval between sending time-frequency resource locations of any two synchronization symbols on the same multicarrier symbol is greater than or equal to the frequency domain interference range.

Exemplarily, the transmultiplexer response is exemplarily illustrated below:
interference with different degrees is generated between the symbols on different time-frequency resource locations due to the influence of transmultiplexers (Transmultiplexer) on both the transmitting terminal and the receiving terminal. The sending symbol on one sending time-frequency resource location will generate interference on the available receiving symbols on other receiving time-frequency resource locations on the surrounding of the corresponding receiving time-frequency resource location. Assuming that the sending symbol of the transmitting terminal at the sending time-frequency resource location (0,0) is 1, and no symbol is sent on other sending time-frequency resource locations, then at the receiving terminal, the value of disturbance generated by the sending symbol 1 of the sending time-frequency resource location (0,0) on the other receiving time-frequency resource locations on the surrounding of the receiving time-frequency resource location (0,0) is called transmultiplexer response, or is called pulse response, filter bank interference factor and the like of a transceiver transmission system and is collectively called the transmultiplexer response in the embodiment of the present disclosure. It should be noted that, under normal circumstances, after the transmultiplexers at both of the transmitting terminal and the receiving terminal are determined, the transmultiplexer response is determined.

Table 1 is a typical example of transmultiplexer response of the FBMC system, wherein rows represent the serial numbers of the subcarriers, and columns represent the serial numbers of the multicarrier symbols; elements in the table are called the transmultiplexer response and represent the response of the sending symbol on the sending time-frequency resource location (0,0) to the receiving time-frequency resource locations on the surrounding of the receiving time-frequency resource location (0,0). For example, assuming that the sending symbol on the sending time-frequency resource location (0,0) is $s_0$, and the response of the sending time-frequency resource location (0,0) to the receiving time-frequency resource location (m,n) is $a_{mn}$, then the receiving symbol generated by $s_0$ on the receiving time-frequency resource location (m,n) is $a_{mn}s_0$. If not processed, the receiving symbol $a_{mn}s_0$ will generate interference on the available receiving symbol corresponding to the sending symbol on the sending time-frequency resource location (m,n), wherein m and n are not simultaneously zero. In addition, j in the elements in Table 1 represents an imaginary unit.

TABLE 1

| | \multicolumn{9}{c}{multicarrier symbol} |
|---|---|---|---|---|---|---|---|---|---|
| subcarrier | −4 | −3 | −2 | −1 | 0 | 1 | 2 | 3 | 4 |
| −2 | 0 | 0.0006 | −0.0001 | 0 | 0 | 0 | −0.0001 | 0.0006 | 0 |
| −1 | 0.0054 | j.0429 | −0.1250 | −j.2058 | 0.2393 | j.2058 | −0.1250 | −j.0429 | 0.0054 |
| 0 | 0 | −0.0668 | 0.0002 | 0.5644 | 1 | 0.5644 | 0.0002 | −0.0668 | 0 |
| 1 | 0.0054 | −j.0429 | −0.1250 | j.2058 | 0.2393 | −j.2058 | −0.1250 | j.0429 | 0.0054 |
| 2 | 0 | 0.0006 | −0.0001 | 0 | 0 | 0 | −0.0001 | 0.0006 | 0 |

It can be seen from Table 1 that, in the frequency domain direction (subcarrier direction), the response of the time-frequency resource location away from the subcarrier 0 for 2 subcarriers (subcarrier +/−2) or larger than 2 subcarriers is very small and may be omitted; in the time domain direction (multicarrier symbol direction), the response of the time-frequency resource location away from the multicarrier symbol 0 for 4 or more than 4 multicarrier symbols is very small and may be omitted, and moreover on the subcarrier 0, the response of the time-frequency resource location away from the multicarrier symbol 0 for 2 multicarrier symbols is very small and may be omitted.

To sum up, on the same multicarrier symbol, mutual interference may be generated between symbols on adjacent subcarriers, and basically, no mutual interference is generated between symbols with distances of at least two subcarriers; on the same subcarrier, the mutual interference of the symbols on different multicarrier symbols may arrive at a plurality of multicarrier symbols.

A non-ignorable transmultiplexer response range is called an interference range of the transmultiplexer in the embodiment, and the interference range of the transmultiplexer includes a frequency domain interference range and a time domain interference range. For example, the interference range of the transmultiplexer as shown in table 1 may be a 3×7 range with the central position as a center, specifically, a range formed by 3 time-frequency resource locations on the frequency domain (the subcarrier direction) and 7 time-frequency resource locations on the time domain (the multicarrier symbol direction) with the time-frequency resource location (0, 0) as the center.

Therefore, when the interval between the sending time-frequency resource locations of any two synchronization symbols on the same multicarrier symbol is greater than or equal to the frequency domain interference range, the any two synchronization symbols on the multicarrier symbol generate no mutual interference, or the generated mutual interference may be omitted.

It should be noted that, in the optional implementation manner, the synchronization symbols are placed according to the interference range of the transmultiplexer on the frequency domain, of course, the interval of the synchronization symbols may also be determined according to other manners, for example, one synchronization symbol is placed after every other subcarrier or every few subcarriers.

102: A time-frequency resource location having mutual interference with the synchronization symbol is determined;

Exemplarily, in the FBMC system, the data symbol is generally a pure real number or a pure imaginary number, and the disturbance variables in the receiving symbol corresponding to the data symbol are generally concentrated on the unused imaginary part or real part of the data symbol, therefore, after channel balance is performed on the receiving symbol, inter-symbol interference may be eliminated by an operation of separating the real part from the imaginary part, and the process of eliminating the interference is called a data processing procedure. A synchronization procedure is greatly different from the data processing procedure. In the synchronization procedure, the receiving terminal may not obtain channel information in general, resulting in that the channel balance may not be performed, and thus the inter-symbol interference may not be eliminated by the operation of separating the real part from the imaginary part. Therefore, interference on the synchronization symbol needs to be avoided at the transmitting terminal, namely, the time-frequency resource location having mutual interference with the synchronization symbol needs to be determined.

Further, step 102 may include: taking the time-frequency resource location with transmultiplexer response of the synchronization symbol within a preset range as the time-frequency resource location having mutual interference with the synchronization symbol according to the transmultiplexer response.

Exemplary, the preset range may be a threshold, the transmultiplexer response of the synchronization symbol within the preset range may include: the transmultiplexer response of the synchronization symbol is smaller than or equal to the threshold, and the threshold may be zero or a very small value (which may be omitted). When the transmultiplexer response of the synchronization symbol is smaller than or equal to the threshold, it may be considered that the data symbol sent on the time-frequency resource location where the response is located generates no interference on the synchronization symbol. The threshold may be set according to experience or actual demand.

103: The synchronization symbol is sent on the sending time-frequency resource location of the synchronization symbol, and a protection symbol is sent on the time-frequency resource location having mutual interference with the synchronization symbol.

Exemplarily, the protection symbol is sent on the time-frequency resource location having mutual interference with the synchronization symbol for avoiding the interference of the data symbol on the synchronization symbol.

Further, the method may further include: determining a value of the synchronization symbol.

Exemplarily, the value of each synchronization symbol may be a real number or an imaginary number randomly generated by the transmitting terminal, in order to reduce the complexity of a frequency synchronization algorithm at the receiving terminal, optionally, the values of the synchronization symbols on the same multicarrier symbol are symmetrical with respect to the central frequency of the synchronization signal. Further optionally, the values of the synchronization symbols on the same multicarrier symbol are real numbers. Wherein, the method for reducing the complexity of the frequency synchronization algorithm at the receiving terminal may refer to the following specific embodiment part.

Further, the method may further include: determining a value of the protection symbol.

Exemplarily, the interference of the data symbol on the synchronization symbol may be avoided by attanging the protection symbol on the surrounding of the synchronization symbol, specifically, the disturbance variable of the value of the protection symbol on the synchronization symbol is zero. Optionally, the value of the protection symbol is zero.

Further optionally, the determining a value of the protection symbol may further include:

determining the value of the protection symbol according to the transmultiplexer response, the sending time-frequency resource location of the synchronization symbol and the time-frequency resource location having mutual interference with the synchronization symbol.

Exemplarily, the value of the protection symbol may be zero and may also be a non-zero value, which is set according to the transmultiplexer response, the sending time-frequency resource location of the synchronization symbol, the time-frequency resource location having mutual interference with the synchronization symbol and the property that the disturbance variable of the value of the protection symbol on the synchronization symbol is zero, and specific reference may be made to related part in the following first embodiment.

Further, step 103 may specifically include: determining a mapping interval of the synchronization symbol on the frequency domain, and placing the synchronization symbol according to the mapping interval and the value of the synchronization symbol. Wherein, the mapping interval may be set according to experience or demands in an actual application process. Specifically, in the interference range, the larger the mapping interval is, the smaller the interference between adjacent synchronization symbols is, the more accurate the synchronization of the FBMC system is, but the larger the mapping interval is, the cost of the synchronization signal will be increased, or the number of the synchronization symbols in the synchronization signal is relatively small, resulting in inaccurate synchronization; therefore, the mapping interval of the synchronization symbols on the frequency domain may be determined according to the balance of synchronization precision and the cost. Further, the time-frequency resource locations having mutual interference with the synchronization symbol are different as mapping intervals of the synchronization symbols on the frequency domain are different.

According to the method for sending a synchronization signal in the FBMC system provided by the embodiment of the present disclosure, by determining the sending time-frequency resource location of the synchronization symbol and the time-frequency resource location having mutual interference with the synchronization symbol, sending the synchronization symbol on the sending time-frequency resource location of the synchronization symbol, and sending the protection symbol on the time-frequency resource location having mutual interference with the synchronization symbol, synchronization of the FBMC system is achieved using one synchronization signal, thereby the cost of the synchronization signal is saved and the spectral efficiency is improved.

An exemplary illustration of the above-mentioned method will be given below through several specific embodiments.

Embodiment 1

Figure 3:
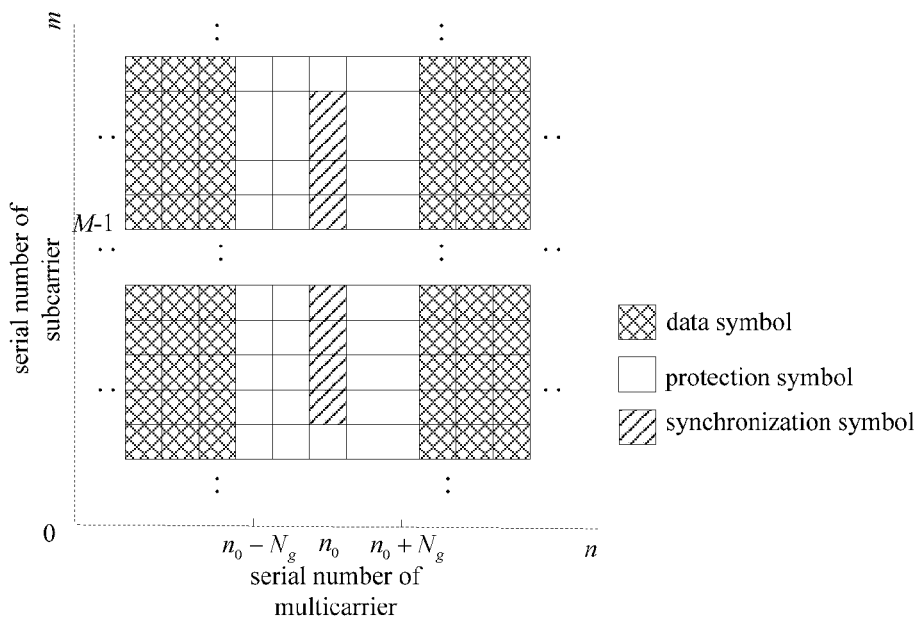
FIG. 3 is a schematic diagram of a multicarrier signal containing a synchronization signal provided by an embodiment of the present disclosure.

Referring to FIG. 3, it is a schematic diagram of a multicarrier signal containing a synchronization signal, wherein a horizontal axis represents the serial number of the multicarrier symbol, and a vertical axis represents the serial number of the subcarrier; each grid represents a time-frequency resource location; a grid marked by an oblique line represents that the symbol on the time-frequency resource location is a synchronization symbol; a blank grid represents that the protection symbol is sent on the time-frequency resource location; a grid marked in gray represents that the symbol on the time-frequency resource location is a data symbol. The time-frequency resource location where the synchronization signal is located occupies M−2 subcarriers (the serial numbers of the subcarriers are 1~M−2) in total, and the serial number of the multicarrier symbol where the synchronization symbol is located is $n_0$.

Figure 4:
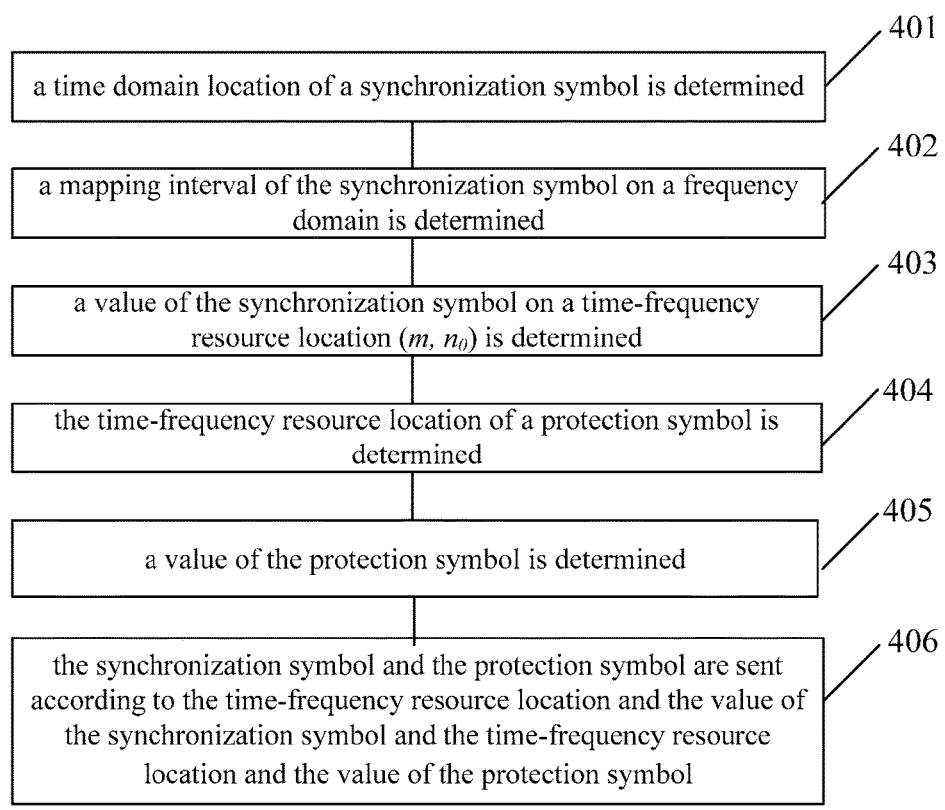
FIG. 4 is a schematic diagram of a flow of another method for sending a synchronization signal provided by an embodiment of the present disclosure.

Referring to FIG. 4, it is a method for sending a synchronization signal in an FBMC system provided by an embodiment of the present disclosure, including:

401: A time domain location (a multicarrier symbol $n_0$) of a synchronization symbol is determined;

Exemplarily, protection symbols are arranged on both sides of the synchronization symbol in the present embodiment.

402: A mapping interval of the synchronization symbol on a frequency domain is determined;

Exemplarily, synchronization symbols $d_{m,n_0}$ are placed on all the subcarriers of the symbol $n_0$ where the synchronization symbol is located, or one synchronization symbol $d_{m,n_0}$ is placed every other subcarrier or every few subcarriers, or the interval of the synchronization symbols is determined according to an interference range of a transmultiplexer on the frequency domain, and the like.

Example 1, referring to FIG. 3, the synchronization symbols $d_{m,n_0}$ are placed on all subcarriers. The synchronization symbols $d_{m,n_0}$ are placed on a frequency domain subcarrier location starting from the synchronization symbol determined in step 402, and $d_{m,n_0}=b_{m,n_0}$ is satisfied.

Figure 5:
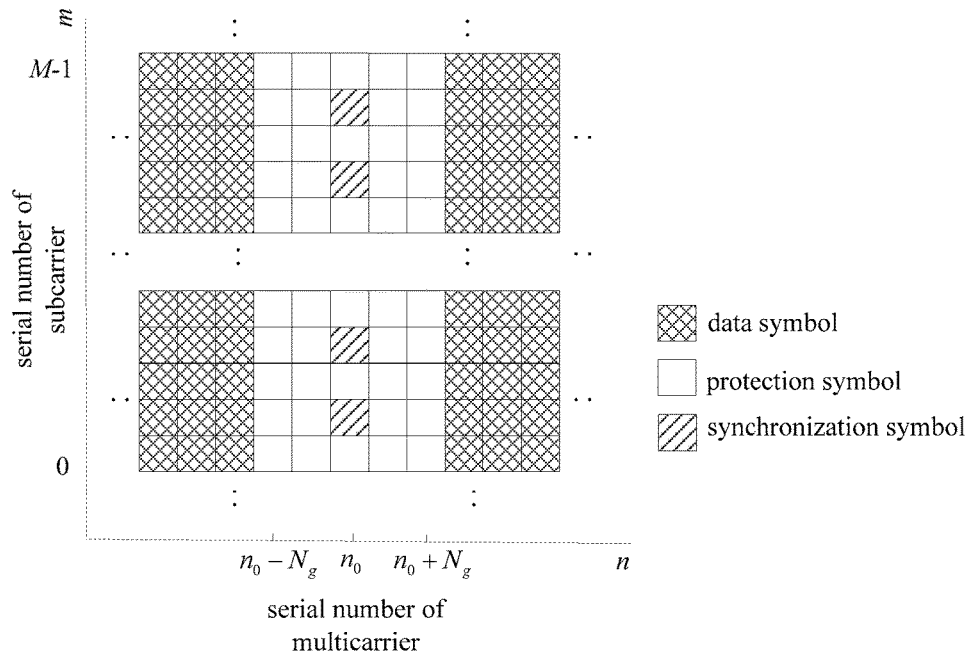
FIG. 5 is a schematic diagram of a synchronization symbol placed provided by an embodiment of the present disclosure.

Example 2, referring to FIG. 5, one synchronization symbol is placed every other subcarrier. The synchronization symbol $d_{m,n_0}$ is placed every other subcarrier on the frequency domain subcarrier location starting from the synchronization symbol determined in step 402, and $d_{m,n_0}=b_{m,n_0}$ is satisfied.

Example 3, assuming that the interference range of the transmultiplexer on the frequency domain is $N_f$, one synchronization symbol $d_{m,n_0}$ is placed after every $N_f$ subcarriers, and $d_{m,n_0}=b_{m,n_0}$ is satisfied. For example, one synchronization symbol $d_{m,n_0}$ may be placed after every two subcarriers, and $d_{m,n_0}=b_{m,n_0}$ is satisfied.

It should be noted that, the method for determining the mapping interval of the synchronization symbol on the frequency domain is not limited in the embodiment of the present disclosure, for example, the distance between two adjacent synchronization symbols may be different.

403: A value of the synchronization symbol on a time-frequency resource location (m, $n_0$) is determined;

Exemplarily, the value of the synchronization symbol on the time-frequency resource location (m, $n_0$) may be a random number, and in order to reduce the complexity of the frequency synchronization algorithm at the receiving terminal, the embodiment is illustrated by taking it as an example that the values of the synchronization symbols on the same multicarrier symbol are symmetrical with respect to the central frequency of the synchronization signal and the values of the synchronization symbols on the same multicarrier symbol are real numbers.

Assuming that the value of the synchronization symbol on the time-frequency resource location (m, $n_0$) is $b_{m,n_0}$, wherein $1 \leq m \leq M-2$, then $b_{m,n_0}$ may be represented as follows:

$b_{m,n_0} = b_{M-m-1,n_0}, (m \in \{1,2,L,M/2-1\})$, $M$ is an even number $b_{m,n_0} = b_{M-m-1,n_0}, (m \in \{1,2,L,(M-1)/2-1\})$, $M$ is an odd number 404: The time-frequency resource location of a protection symbol is determined;

specifically, on the time domain, the range of protection symbols on two adjacent sides of the time domain location of the synchronization symbol should be larger than the time domain interference range of the transmultiplexer; for example, in FIG. 3, protection symbols on Ng subcarriers are contained on both sides of a subcarrier $n_0$, wherein Ng refers to the time domain interference range of the transmultiplexer. On the frequency domain, the range of the protection symbols on the frequency domain is determined according to the frequency domain interference range of the transmultiplexer; for example, the protection symbols are located on the subcarrier 0 and the subcarrier M in FIG. 3.

It should be noted that, in a specific implementation process, the implementation sequences of step 403 and step 404 may be inverted.

405: A value of the protection symbol is determined;

Exemplarily, the value of the protection symbol on the time-frequency resource location (m, n) is marked as $c_{m,n}$. $c_{m,n}$ satisfies the property that the disturbance variable on the synchronization symbol is zero.

Assuming that the time-frequency resource location where the synchronization symbol is located is ($m_0$, $n_0$), the time-frequency resource location of the protection symbol having interference on the synchronization symbol on the time-frequency resource location ($m_0$, $n_0$) is (m, n), the location set of all the protection symbols having interference on the synchronization symbol on the time-frequency resource location ($m_0$, $n_0$) is $\Omega_{m_0, n_0}$, and the value of transmultiplexer response generated by the protection symbol on the time-frequency resource location (m, n) on the time-frequency resource location ($m_0$, $n_0$) is $t_{m_0-m,n_0-n}$, wherein the time-frequency resource location (m, n) and the set $\Omega_{m_0, n_0}$ of the protection symbol are determined by step 404, and the value of the transmultiplexer response $t_{m_0-m,n_0-n}$ is determined by a transmultiplexer response table as shown in Table 1. Then, the value $c_{m,n}$ of the protection symbol on the time-frequency resource location (m, n) may be obtained by solving the following equation, $$\sum_{(m,n) \in \Omega_{m_0,n_0}} c_{m,n} \cdot t_{m_0-m,n_0-n} = 0$$

Exemplarily, the value of $c_{m,n}$ is zero, or is a numerical value conforming to a certain rule.

Example 1, the value of $c_{m,n}$ is zero. Referring to FIG. 3 and FIG. 5, the protection symbols shown in the figures are zero.

Example 2, the value of $c_{m,n}$ is a non-zero numerical value conforming to a certain rule. For example, referring to Table 2, it is a schematic diagram of a location where the synchronization symbol and the protection symbol on a time-frequency two-dimensional resource location is located, and synchronization symbols $d_{m_0,n_0}$ and $d_{m_0-2,n_0}$ are sent respectively on the time-frequency resource location ($m_0$, $n_0$) and on the time-frequency resource location ($m_0+2$, $n_0$) within a range of 3×5 time-frequency two-dimensional resource grids, and protection signals are sent on other time-frequency resource locations. Wherein, the range of the 3×5 time-frequency two-dimensional resource grids is specifically a range formed by 3 time-frequency resource locations on the frequency domain (the subcarrier direction) and 5 time-frequency resource locations on the time domain (the multicarrier symbol direction).

TABLE 2

| $C_{m_0-1,n_0-1}$ | $C_{m_0-1,n_0}$ | $C_{m_0-1,n_0+1}$ |
| $C_{m_0,n_0-1}$ | $d_{m_0,n_0}$ | $C_{m_0,n_0+1}$ |
| $C_{m_0+1,n_0-1}$ | $C_{m_0+1,n_0}$ | $C_{m_0+1,n_0+1}$ |
| $C_{m_0+2,n_0-1}$ | $d_{m_0+2,n_0}$ | $C_{m_0+2,n_0+1}$ |
| $C_{m_0+3,n_0-1}$ | $C_{m_0+3,n_0}$ | $C_{m_0+3,n_0+1}$ |

To ensure that the disturbance variable of the protection symbol on the synchronization symbol is zero, the value of the protection symbol on each time-frequency resource location is as shown in Table 3. It can be seen from Table 3 that $c_{m_0-1,n} = c_{m_0+3,n}$, wherein $n = n_0-1$, $n_0$, $n_0+1$. Namely, the value of the protection symbol repeats with four subcarriers as a cycle.

TABLE 3

| -1 | 1 | 1 |
| -j | $d_{m_0,n_0}$ | j |
| -1 | -1 | 1 |
| -j | $d_{m_0+2,n_0}$ | j |
| -1 | 1 | 1 |

Example 3, the value of $c_{m,n}$ is a non-zero numerical value conforming to a certain rule or is zero. For example, the value of the protection symbol on each time-frequency resource location is as shown in Table 4. It can be seen from the table that $c_{m_0-1,n} = c_{m_0+1,n}$ wherein $n = n_0-1$, $n_0$, $n_0+1$. Namely, the value of the protection symbol repeats with 2 subcarriers as a cycle. The value of the protection symbol on each time-frequency resource location is as shown in Table 5. It can be seen from the table that $c_{m_0-1,n} = c_{m_0+3,n}$, wherein $n = n_0-1$, $n_0$, $n_0+1$. Namely, the value of the protection symbol repeats with 4 subcarriers as a cycle.

TABLE 4

| 0 | 0 | 0 |
| -j | $d_{m_0,n_0}$ | j |
| 0 | 0 | 0 |
| -j | $d_{m_0+2,n_0}$ | j |
| 0 | 0 | 0 |

TABLE 5

| 0 | 0 | -1 |
| -j | $d_{m_0,n_0}$ | j |
| 1 | 0 | 0 |
| 1 | $d_{m_0+2,n_0}$ | -1 |
| 0 | 0 | -1 |

406. The synchronization symbol and the protection symbol are sent according to the time-frequency resource location and the value of the synchronization symbol and the time-frequency resource location and the value of the protection symbol.

The above-mentioned method may be used for sending the synchronization signal to reduce the complexity of the frequency synchronization algorithm at the receiving terminal, which will be illustrated below:

in the method for sending a synchronization signal above-mentioned, since the synchronization symbols $d_{n_0,m}$ are real numbers and are symmetrical with respect to the central subcarrier, the synchronization symbols s(t) sent by the transmitting terminal satisfy the property of being symmetrical with respect to the central frequency of the synchronization signal, namely: s(t+m)=s(t−m), m∈{1, 2, . . . M/2−1}, M is an even number, or m∈{1, 2 . . . (M−1)/2−1}, M is an odd number.

Assuming that the receiving terminal receives the synchronization signal r(t+τ) at t+τ moment which is sent by the transmitting terminal at t moment, wherein τ refers to a delay time. Receiving symbols obtained by the receiving terminal and symmetrical with respect to the t+τ moment are respectively represented as $x_+[m]$ and $x_-[m]$, wherein $x_+[m]$= r[(t+τ)+m], $x_-[m]$=r[(t+τ)−m]. Then, at the receiving terminal, frequency synchronization may be achieved by the following frequency offset estimation algorithm:

$$\hat{f}_\Delta = \sum_{m=1}^{M/2-1} \frac{w_m}{4\pi m} \angle\left(\frac{x_+[m]}{x_-[m]}\right) \quad (M \text{ is an even number})$$

$$\hat{f}_\Delta = \sum_{m=1}^{(M-1)/2-1} \frac{w_m}{4\pi m} \angle\left(\frac{x_+[m]}{x_-[m]}\right) \quad (M \text{ is an odd number})$$

wherein, $$w_m = \frac{m}{\sum_{i=1}^{M/2-1} i}$$

represents a linear weight coefficient, and ∠(·) refers to an operator of taking a variable angle. The distance of the two sampling points $x_+[m]$ and $x_-[m]$ has great influence on a frequency offset estimation result, in general, the frequency offset estimated by the closer sampling points is susceptible to interference and noise, therefore, by adjusting the weight coefficient, the frequency offset result estimated by the closer sampling points has a smaller weight coefficient through and the frequency offset result estimated by the farther sampling points has a larger weight coefficient. So that an averaged result is more accurate.

Embodiment 2

Figure 6:
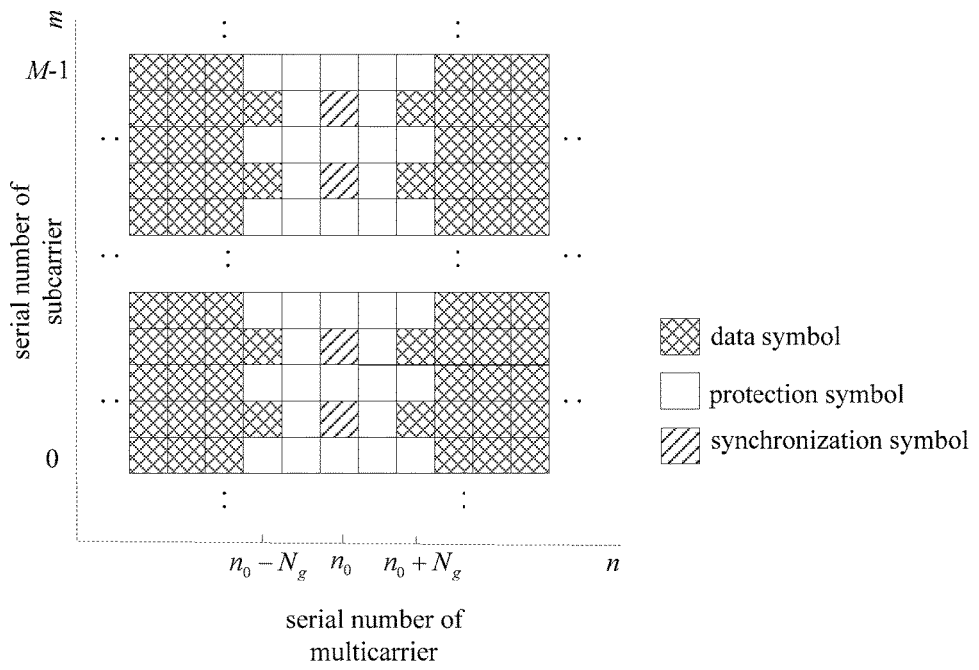
FIG. 6 is a schematic diagram of another synchronization symbol placed provided by an embodiment of the present disclosure.

The embodiment is based on embodiment 1, and for concision of description, only difference with embodiment 1 is described herein:

the data symbol is sent on a time-frequency resource location at which the transmultiplexer response is zero or approximately zero, namely, is not serving as the protection symbol. An illustration will be given with the transmultiplexer response Table 1 as an example, it can be seen from Table 1 that, on the subcarrier where the sending symbol 1 on the time-frequency resource location 00 is located, the response (0.0002) on the time-frequency resource location away from the sending symbol 1 for two multicarrier symbols is close to zero, thus the data symbols may be sent on the two time-frequency resource locations, and specific reference may be made to FIG. 6.

Compared with embodiment 1, the cost of the synchronization signal is reduced in the present embodiment.

Embodiment 3

The difference from embodiment 1 and embodiment 2 lies in that, the synchronization signal in the present embodiment is located at a starting position or an end position of once continuous signal transmission, protection symbols are arranged on both sides of the synchronization symbol in the synchronization signal, but the time-frequency resource locations of the protection symbols are asymmetric.

Figure 7A:
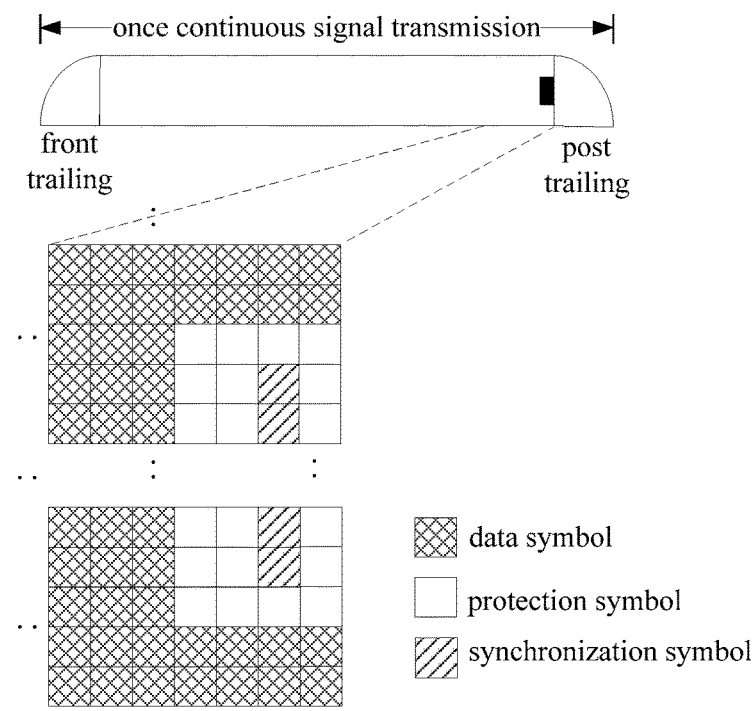
FIG. 7(a) is a schematic diagram of a synchronization signal provided by an embodiment of the present disclosure.
Figure 7B:
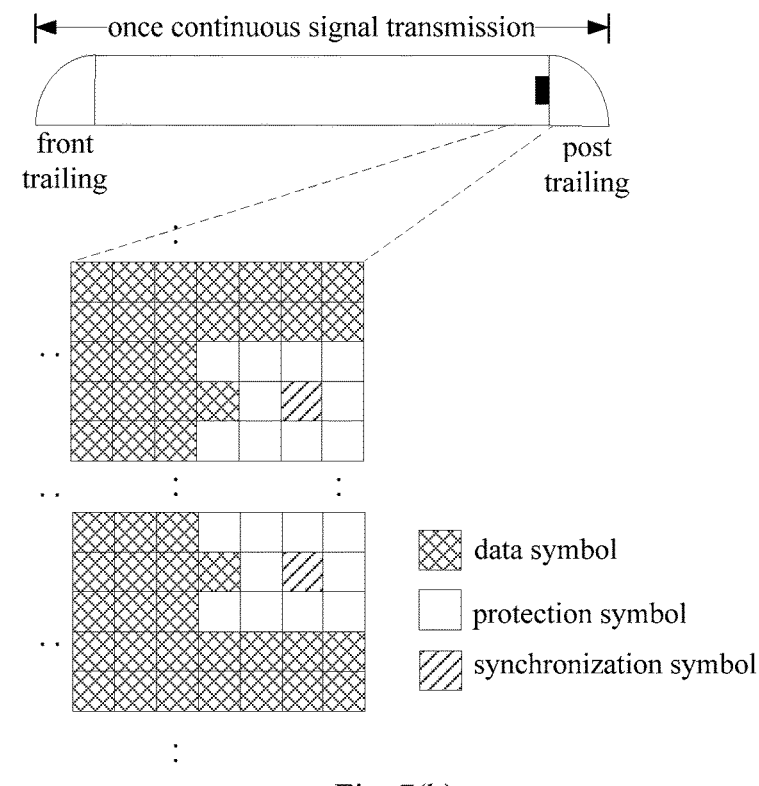
FIG. 7(b) is a schematic diagram of another synchronization signal provided by an embodiment of the present disclosure.

1) The synchronization signal is located at the end position of once continuous signal transmission Referring to FIG. 7(a), it is a synchronization symbol based on the example 2 in embodiment 1, and referring to FIG. 7(b), it is a synchronization symbol based on embodiment 2.

Figure 7C:
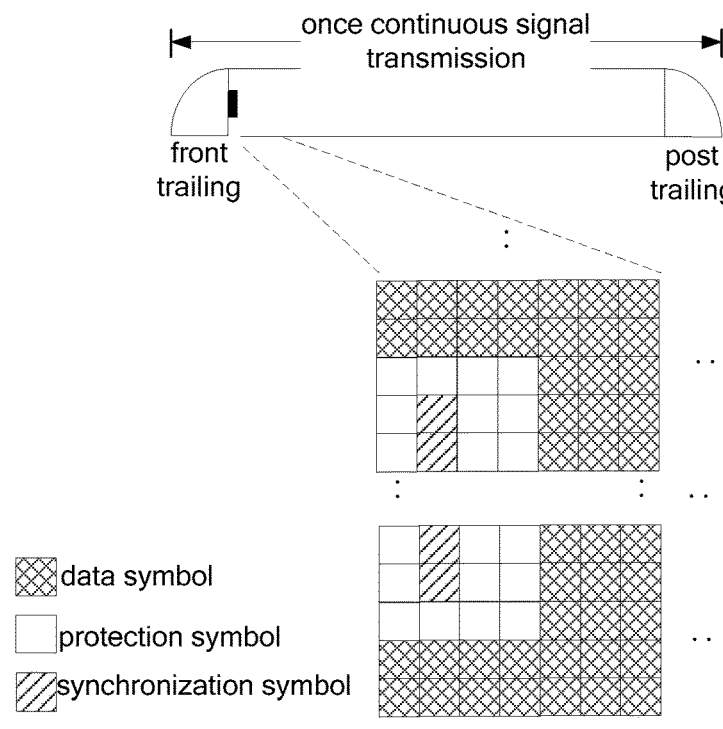
FIG. 7(c) is a schematic diagram of another synchronization signal provided by an embodiment of the present disclosure.
Figure 7D:
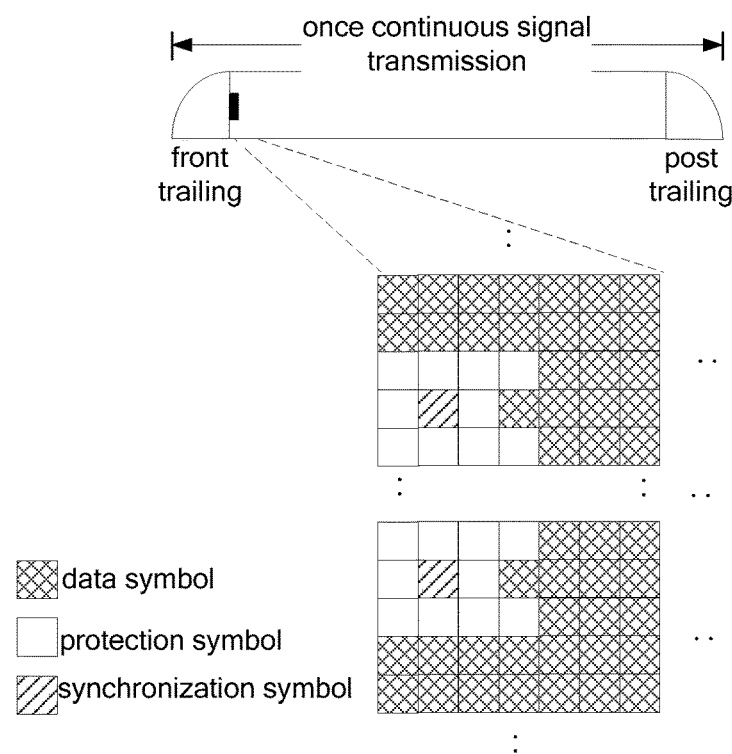
FIG. 7(d) is a schematic diagram of another synchronization signal provided by an embodiment of the present disclosure.

2) The synchronization signal is located at the starting position of once continuous signal transmission Referring to FIG. 7(c), it is a synchronization symbol based on embodiment 1, and referring to FIG. 7(d), it is a synchronization symbol based on embodiment 2.

Compared with the synchronization symbol determined in embodiment 1, the synchronization symbol based on embodiment 1 in the present embodiment may reduce the cost of the synchronization signal; or compared with the synchronization symbol determined in embodiment 2, the synchronization symbol based on embodiment 2 in the present embodiment may reduce the cost of the synchronization signal.

Embodiment 4

The difference from embodiment 1 and embodiment 2 lies in that, the synchronization signal in the present embodiment is located at a starting position or an end position of once continuous signal transmission, and the protection symbol is only arranged on one side of the synchronization symbol in the synchronization signal.

Figure 8A:
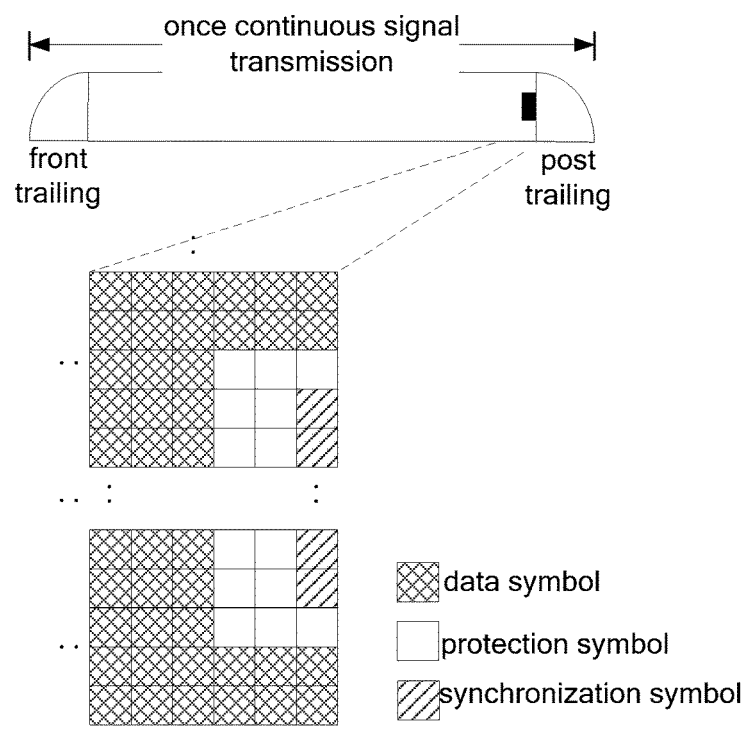
FIG. 8(a) is a schematic diagram of another synchronization signal provided by an embodiment of the present disclosure.
Figure 8B:
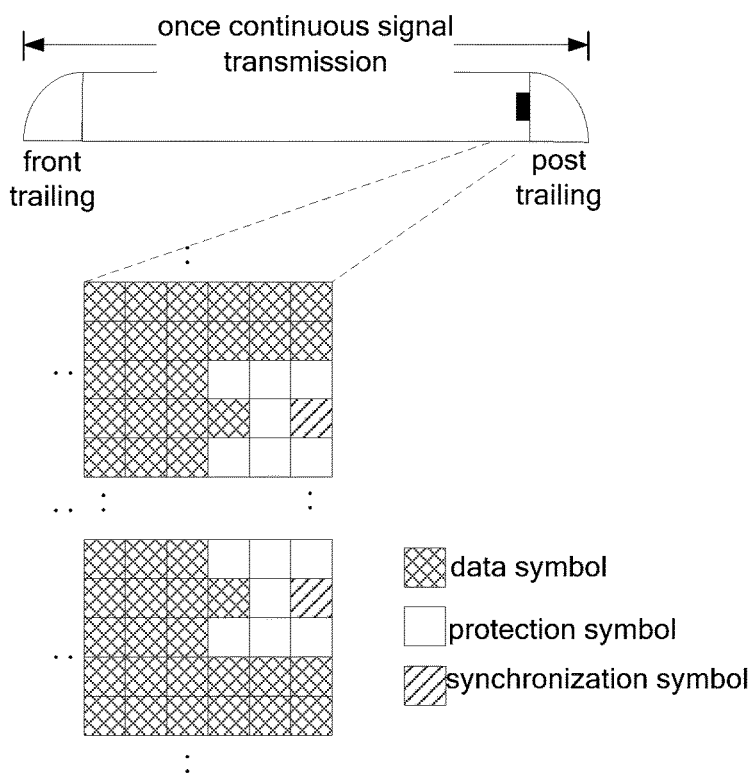
FIG. 8(b) is a schematic diagram of another synchronization signal provided by an embodiment of the present disclosure.

The present embodiment will be illustrated below in two conditions:

1) The synchronization signal is located at the end position of once continuous signal transmission Referring to FIG. 8(a), it is a synchronization symbol based on example 2 in embodiment 1, and referring to FIG. 8(b), it is a synchronization symbol based on embodiment 2.

Under the condition, the protection symbol is only arranged before the synchronization symbol.

Figure 8C:
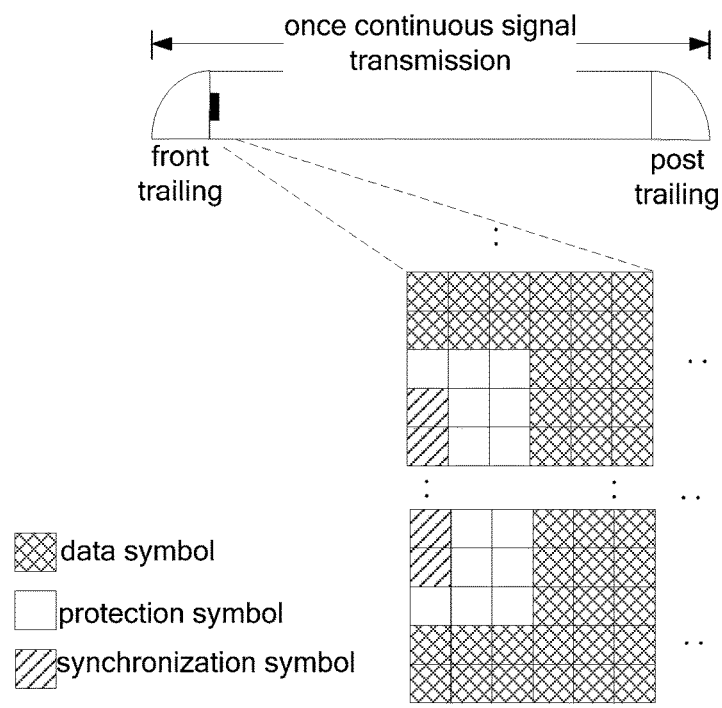
FIG. 8(c) is a schematic diagram of another synchronization signal provided by an embodiment of the present disclosure.
Figure 8D:
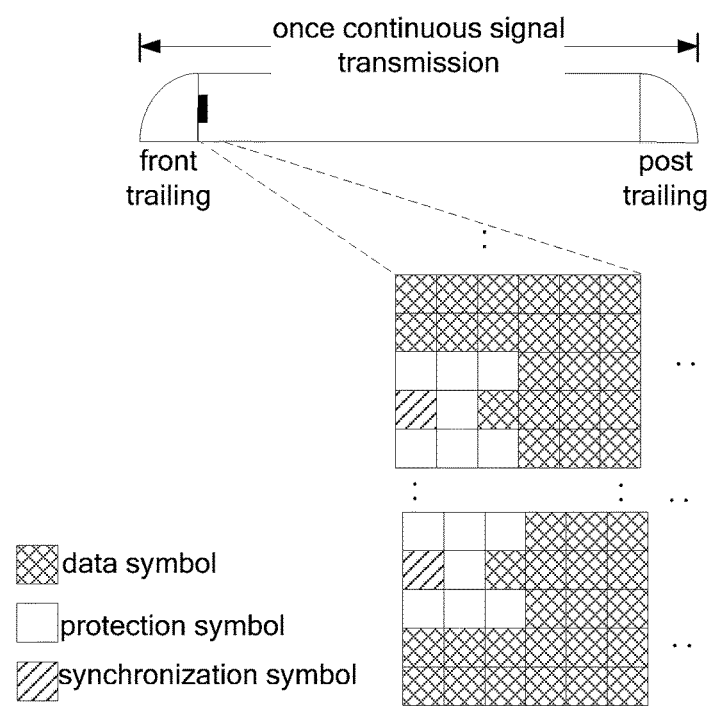
FIG. 8(d) is a schematic diagram of another synchronization signal provided by an embodiment of the present disclosure.

2) The synchronization signal is located at the starting position of once continuous signal transmission Referring to FIG. 8(c), it is a synchronization symbol based on embodiment 1, and referring to FIG. 8(d), it is a synchronization symbol based on embodiment 2.

Under the condition, the protection symbol is only arranged after the synchronization symbol.

Compared the 1) in the present embodiment with the 1) in embodiment 3, or compared the 2) in the present embodiment with the 2) in embodiment 3, may reduce the cost of the synchronization signal.

According to the method for sending the synchronization signal in the FBMC system provided by the embodiment of the present disclosure, by determining the sending time-frequency resource location of the synchronization symbol, determining the time-frequency resource location having mutual interference with the synchronization symbol, sending the synchronization symbol on the sending time-frequency resource location of the synchronization symbol, and sending the protection symbol on the time-frequency resource location having mutual interference with the synchronization symbol, synchronization of the FBMC system is achieved using one synchronization signal, thereby the cost of the synchronization signal is saved and the spectral efficiency is improved.

Figure 9:
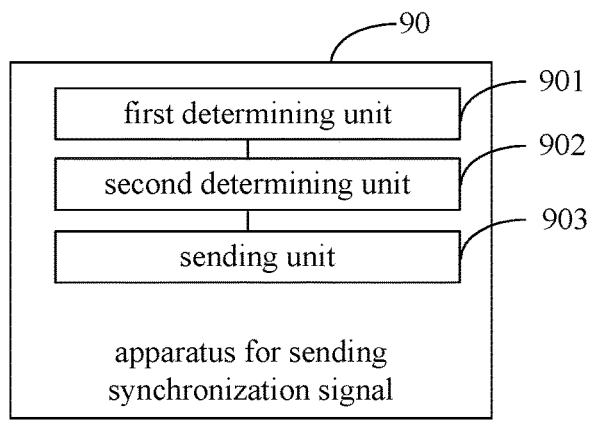
FIG. 9 is a schematic diagram of a structure of an apparatus for sending a synchronization signal provided by an embodiment of the present disclosure.

In one aspect, referring to FIG. 9, it is an apparatus 90 for sending a synchronization signal provided by an embodiment of the present disclosure, which may be applied to an FBMC system for implementing the method for sending the synchronization signal as shown in FIG. 1, and the apparatus 90 may include:

a first determining unit 901, configured to determine a sending time-frequency resource location and a value of a synchronization symbol;

a second determining unit 902, configured to determine a time-frequency resource location having mutual interference with the synchronization symbol;

a sending unit 903, configured to send the synchronization symbol on the sending time-frequency resource location of the synchronization symbol, and send a protection symbol on the time-frequency resource location having mutual interference with the synchronization symbol.

Further, the sending time-frequency resource location of the synchronization symbol is located on at least one multicarrier symbol of a starting position or an end position of once continuous signal transmission.

Optionally, the second determining unit 902 is specifically configured to utilize the time-frequency resource location with transmultiplexer response of the synchronization symbol within a preset range as the time-frequency resource location having mutual interference with the synchronization symbol according to the transmultiplexer response.

Optionally, when the sending time-frequency resource location of the synchronization symbol is located on at least one multicarrier symbol of the starting position of once continuous signal transmission, the time-frequency resource location having mutual interference with the synchronization symbol is located on at least one multicarrier symbol after the multicarrier symbol where the synchronization symbol is located;

or, when the sending time-frequency resource location of the synchronization symbol is located on at least one multicarrier symbol of an end position of once continuous signal transmission, the time-frequency resource location having mutual interference with the synchronization symbol is located on at least one multicarrier symbol before the multicarrier symbol where the synchronization symbol is located.

Optionally, the first determining unit 901 is specifically configured to, determine a frequency domain interference range of the synchronization symbol according to the transmultiplexer response; and determine the sending time-frequency resource location of the synchronization symbol according to the frequency domain interference range, wherein an interval between the sending time-frequency resource locations of any two synchronization symbols on the same multicarrier symbol is greater than or equal to the frequency domain interference range.

Figure 10:
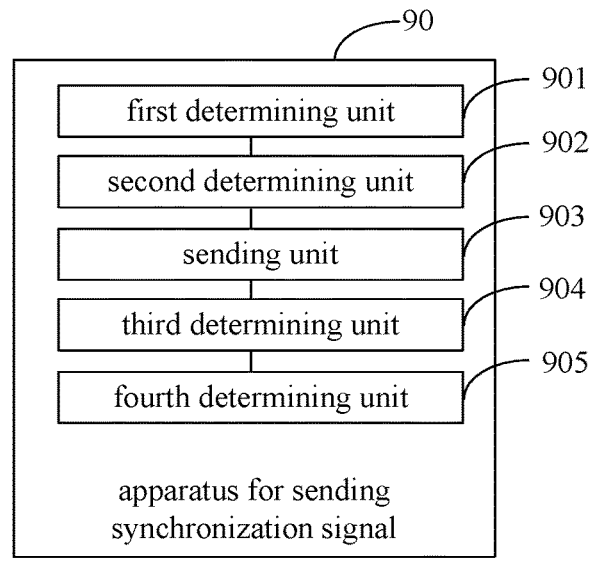
FIG. 10 is a schematic diagram of a structure of another apparatus for sending a synchronization signal provided by an embodiment of the present disclosure.

Further, referring to FIG. 10, the apparatus 90 further includes:

a third determining unit 904, configured to determine a value of the synchronization symbol, wherein the values of the synchronization symbols on the same multicarrier symbol are symmetrical with respect to the central frequency of the synchronization signal.

Optionally, the values of the synchronization symbols on the same multicarrier symbol are real numbers.

Further, referring to FIG. 10, the apparatus 90 further includes:

a fourth determining unit 905, configured to determine a value of the protection symbol, wherein the disturbance variable of the value of the protection symbol on the synchronization symbol is zero.

Optionally, the value of the protection symbol is zero.

Optionally, the fourth determining unit 905 is specifically configured to determine the value of the protection symbol according to the transmultiplexer response, the sending time-frequency resource location of the synchronization symbol and the time-frequency resource location having mutual interference with the synchronization symbol.

According to the apparatus for sending the synchronization signal in the FBMC system provided by the embodiment of the present disclosure, by determining the sending time-frequency resource location of the synchronization symbol, determining the time-frequency resource location having mutual interference with the synchronization symbol, sending the synchronization symbol on the sending time-frequency resource location of the synchronization symbol, and sending the protection symbol on the time-frequency resource location having mutual interference with the synchronization symbol, synchronization of the FBMC system is achieved using one synchronization signal, thereby the cost of the synchronization signal is saved and the spectral efficiency is improved.

Figure 11:
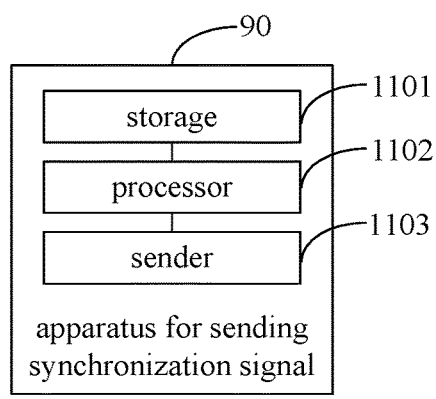
FIG. 11 is a schematic diagram of a structure of another apparatus for sending a synchronization signal provided by an embodiment of the present disclosure.

In one aspect, referring to FIG. 11, it is an apparatus 90 for sending a synchronization signal provided by an embodiment of the present disclosure, which may be applied to an FBMC system for implementing the method for sending a synchronization signal as shown in FIG. 1, and the apparatus 90 may include a memory 1101, a processor 1102 and a sender 1103, wherein, the memory 1101 is configured to store a group of codes, and the codes are used for controlling the processor 1102 to implement the following actions:

determining a sending time-frequency resource location of a synchronization symbol; and determining a time-frequency resource location having mutual interference with the synchronization symbol;

the sender 1103 is configured to send the synchronization signal on the sending time-frequency resource location of the synchronization symbol, and send a protection symbol on the time-frequency resource location having mutual interference with the synchronization symbol.

Further, the sending time-frequency resource location of the synchronization symbol is located on at least one multicarrier symbol of a starting position or an end position of once continuous signal transmission.

Optionally, the processor 1102 is specifically configured to utilize the time-frequency resource location with transmultiplexer response of the synchronization symbol within a preset range as the time-frequency resource location having mutual interference with the synchronization symbol according to the transmultiplexer response.

Optionally, when the sending time-frequency resource location of the synchronization symbol is located on at least one multicarrier symbol of the starting position of once continuous signal transmission, the time-frequency resource location having mutual interference with the synchronization symbol is located on at least one multicarrier symbol after the multicarrier symbol where the synchronization symbol is located;

or, when the sending time-frequency resource location of the synchronization symbol is located on at least one multicarrier symbol of an end position of once continuous signal transmission, the time-frequency resource location having mutual interference with the synchronization symbol is located on at least one multicarrier symbol before the multicarrier symbol where the synchronization symbol is located.

Optionally, the processor 1102 is specifically configured to, determine a frequency domain interference range of the synchronization symbol according to transmultiplexer response; and determine the sending time-frequency resource location of the synchronization symbol according to the frequency domain interference range, wherein an interval between the sending time-frequency resource locations of any two synchronization symbols on the same multicarrier symbol is larger than or equal to the frequency domain interference range.

The processor 1102 is further configured to determine a value of the synchronization symbol, wherein the values of the synchronization symbols on the same multicarrier symbol are symmetrical with respect to the central frequency of the synchronization signal.

Optionally, the values of the synchronization symbols on the same multicarrier symbol are real numbers.

The processor 1102 is further configured to determine a value of the protection symbol, wherein the disturbance variable of the value of the protection symbol on the synchronization symbol is zero.

Optionally, the value of the protection symbol is zero.

Optionally, the processor 1102 is specifically configured to determine the value of the protection symbol according to the transmultiplexer response, the sending time-frequency resource location of the synchronization symbol and the time-frequency resource location having mutual interference with the synchronization symbol.

According to the apparatus for sending the synchronization signal in the FBMC system provided by the embodiment of the present disclosure, by determining the sending time-frequency resource location of the synchronization symbol, determining the time-frequency resource location having mutual interference with the synchronization symbol, sending the synchronization symbol on the sending time-frequency resource location of the synchronization symbol, and sending the protection symbol on the time-frequency resource location having mutual interference with the synchronization symbol, synchronization of the FBMC system is achieved using one synchronization signal, thereby the cost of the synchronization signal is saved and the spectral efficiency is improved.

Those skilled in the art to which the present disclosure pertains may clearly understand that, for the convenience and simplicity of description, for the specific working processes of the system, the apparatus and the units described above, may refer to corresponding processes in the foregoing method embodiments, and will not be repeated redundantly herein.

In the several embodiments provided in the present application, it should be understood that, the disclosed apparatus and method may be implemented in other manners. For example, the apparatus embodiments described above are merely exemplary, e.g., the division of the units is only a logic function division, other division manners may exist in practical implementation, for example, a plurality of units or components may be combined, or some features may be omitted or not implemented. From another point of view, the displayed or discussed mutual coupling or direct coupling or communication connection may be indirect coupling or communication connection of apparatuses or units through some interfaces, and may be in electrical, mechanical or other forms.

The units described as separate components may be separated physically or not, components displayed as units may be physical units or not, namely, may be located in one place, or may be distributed on a plurality of network units. A part of or all of the units may be selected to implement the purposes of the technical solutions in the embodiments according to actual demand.

In addition, the functional units in the embodiments of the present disclosure may be integrated in a processing unit, or the units singly exist physically, or two or more units are integrated in one unit. The above-mentioned integrated unit may be implemented in a hardware form and may also be implemented in a form of hardware and software functional units.

The above-mentioned integrated unit implemented in the form of the software functional unit may be stored in a computer readable storage medium. The above-mentioned software functional unit is stored in a storage medium, including a plurality of instructions for enabling a computer device (may be a personnel computer, a server, or a network device or the like) to execute all or a part of the steps of the method in the embodiments of the present disclosure. The foregoing storage medium includes a variety of media capable of storing program codes, such as a USB disk, a mobile hard disk, a read-only memory (Read-Only Memory, referred to as ROM), a random access memory (Random Access Memory, referred to as RAM), a magnetic disk, an optical disk or the like.

Finally, it should be noted that the above-mentioned embodiments are merely used for illustrating the technical solutions of the present disclosure, rather than limiting them; although the present disclosure has been described in detail with reference to the foregoing embodiments, those of ordinary skill in the art should understand that they could still make modifications to the technical solutions recorded in the foregoing embodiments or make equivalent substitutions to a part of technical features therein; and these modifications or substitutions do not make the essence of the corresponding technical solutions depart from the spirit and scope of the technical solutions of the embodiments of the present disclosure.

What is claimed is:

1. A method for sending a synchronization signal in a filter bank multicarrier (FBMC) system, comprising:
   determining a first time-frequency resource location of a synchronization symbol;
   determining a second time-frequency resource location having mutual interference with the synchronization symbol, wherein the determining the second time-frequency resource location comprises: utilizing a time-frequency resource location with transmultiplexer response of the synchronization symbol within a preset range as the second time-frequency resource location according to the transmultiplexer response; and
   sending the synchronization symbol on the first time-frequency resource location, and sending a protection symbol on the second time-frequency resource location.

2. The method according to claim 1, wherein the first time-frequency resource location is located on at least one multicarrier symbol of one of a starting position of once continuous signal transmission and an end position of once continuous signal transmission.

3. The method according to claim 2, wherein:
when the first time-frequency resource location is located on at least one multicarrier symbol of a starting position of once continuous signal transmission, the second time-frequency resource location is located on at least one multicarrier symbol after the multicarrier symbol where the synchronization symbol is located; and
when the first time-frequency resource location is located on at least one multicarrier symbol of an end position of once continuous signal transmission, the second time-frequency resource location is located on at least one multicarrier symbol before the multicarrier symbol where the synchronization symbol is located.

4. The method according to claim 1, wherein the determining the first time-frequency resource location comprises:
determining a frequency domain interference range of the synchronization symbol according to transmultiplexer response; and
determining the first time-frequency resource location-according to the frequency domain interference range, wherein an interval between first time-frequency resource locations of any two synchronization symbols on the same multicarrier symbol is greater than or equal to the frequency domain interference range.

5. The method according to claim 1, further comprising:
determining a value of the synchronization symbol, wherein the values of the synchronization symbols on the same multicarrier symbol are symmetrical with respect to the central frequency of the synchronization signal.

6. The method according to claim 5, wherein the values of the synchronization symbols on the same multicarrier symbol are real numbers.

7. The method according to claim 1, further comprising:
determining a value of the protection symbol, wherein a disturbance of the value of the protection symbol on the synchronization symbol is zero.

8. The method according to claim 7, wherein the value of the protection symbol is zero.

9. The method according to claim 7, wherein the determining the value of the protection symbol comprises:
determining the value of the protection symbol according to transmultiplexer response, the first time-frequency resource location and the second time-frequency resource location.

10. An apparatus for sending a synchronization signal in a filter bank multicarrier (FBMC) system, comprising:
a memory storing a group of codes; and
a processor configured to execute the codes to cause the apparatus to:
determine a first time-frequency resource location of a synchronization symbol; and
determine a second time-frequency resource location having mutual interference with the synchronization symbol, wherein the determining the second time-frequency resource location comprises: utilizing a time-frequency resource location with transmultiplexer response of the synchronization symbol within a preset range as the second time-frequency resource location according to the transmultiplexer response;
send the synchronization symbol on the first time-frequency resource location, and send a protection symbol on the second time-frequency resource location.

11. The apparatus according to claim 10, wherein the first time-frequency resource location is located on at least one multicarrier symbol of one of a starting position of once continuous signal transmission and an end position of once continuous signal transmission.

12. The apparatus according to claim 11, wherein:
when the first time-frequency resource location is located on at least one multicarrier symbol of a starting position of once continuous signal transmission, the second time-frequency resource location is located on at least one multicarrier symbol after the multicarrier symbol where the synchronization symbol is located; and
when the first time-frequency resource location is located on at least one multicarrier symbol of an end position of once continuous signal transmission, the second time-frequency resource location is located on at least one multicarrier symbol before the multicarrier symbol where the synchronization symbol is located.

13. The apparatus according to claim 10, wherein the processor is further configured to execute the codes to cause the apparatus to:
determine a frequency domain interference range of the synchronization symbol according to transmultiplexer response; and
determine the first time-frequency resource location according to the frequency domain interference range, wherein an interval between first time-frequency resource locations of any two synchronization symbols on the same multicarrier symbol is greater than or equal to the frequency domain interference range.

14. The apparatus according to claim 10, wherein the processor is further configured to execute the codes to cause the apparatus to:
determine a value of the synchronization symbol, wherein the values of the synchronization symbols on the same multicarrier symbol are symmetrical with respect to the central frequency of the synchronization signal.

15. The apparatus according to claim 14, wherein the values of the synchronization symbols on the same multicarrier symbol are real numbers.

16. The apparatus according to claim 10, wherein the processor is further configured to execute the codes to cause the apparatus to:
determine a value of the protection symbol, wherein a disturbance of the value of the protection symbol on the synchronization symbol is zero.

17. The apparatus according to claim 16, wherein the value of the protection symbol is zero.

18. The apparatus according to claim 16, wherein the processor is further configured to execute the codes to cause the apparatus to:
determine the value of the protection symbol according to transmultiplexer response, the first time-frequency resource location and the second time-frequency resource location.

* * * * *